(12) United States Patent
Gallschuetz et al.

(10) Patent No.: US 7,696,947 B2
(45) Date of Patent: Apr. 13, 2010

(54) RADIO FREQUENCY IDENTIFICATION TRANSPONDER ANTENNA

(75) Inventors: Sebastian Gallschuetz, Dresden (DE); Harald Ruprecht, Erftstadt (DE)

(73) Assignee: KSW Microtec AG., Dresden (DE)

( * ) Notice: Subject to any disclaimer, the term of this patent is extended or adjusted under 35 U.S.C. 154(b) by 483 days.

(21) Appl. No.: 11/234,427

(22) Filed: Sep. 23, 2005

(65) Prior Publication Data
US 2007/0052613 A1 Mar. 8, 2007

(51) Int. Cl.
*H01Q 1/50* (2006.01)
(52) U.S. Cl. .................................. 343/860; 340/572.1
(58) Field of Classification Search .................. 343/860, 343/741; 340/572.1, 572.5
See application file for complete search history.

(56) References Cited

U.S. PATENT DOCUMENTS

| | | | |
|---|---|---|---|
| 5,448,110 A * | 9/1995 | Tuttle et al. ................. 257/723 |
| 6,172,608 B1 | 1/2001 | Cole ........................ 340/572.1 |
| 6,285,342 B1 * | 9/2001 | Brady et al. ................. 343/895 |
| 6,741,178 B1 * | 5/2004 | Tuttle ....................... 340/572.1 |
| 7,102,520 B2 * | 9/2006 | Liu et al. .................. 340/572.1 |
| 2006/0001138 A1 * | 1/2006 | Sakama et al. ............. 257/678 |
| 2006/0044769 A1 * | 3/2006 | Forster et al. ............... 361/760 |
| 2006/0214793 A1 * | 9/2006 | Baba ....................... 340/572.1 |

FOREIGN PATENT DOCUMENTS

| EP | 1564839 A2 | 8/2005 |
|---|---|---|
| WO | WO 00/21030 | 4/2000 |
| WO | WO 03/096478 | 11/2003 |

* cited by examiner

*Primary Examiner*—Tan Ho
(74) *Attorney, Agent, or Firm*—Karl Hormann, Esq.

(57) ABSTRACT

A RFID transponder having a microchip or integrated circuit, an impedance-matching structure and a resonant structure mounted on at least one substrate and connected to each other by an electric field.

17 Claims, 3 Drawing Sheets

RADIO FREQUENCY IDENTIFICATION TRANSPONDER ANTENNA

BACKGROUND OF THE INVENTION

1. Field of the Invention

Figure 1:
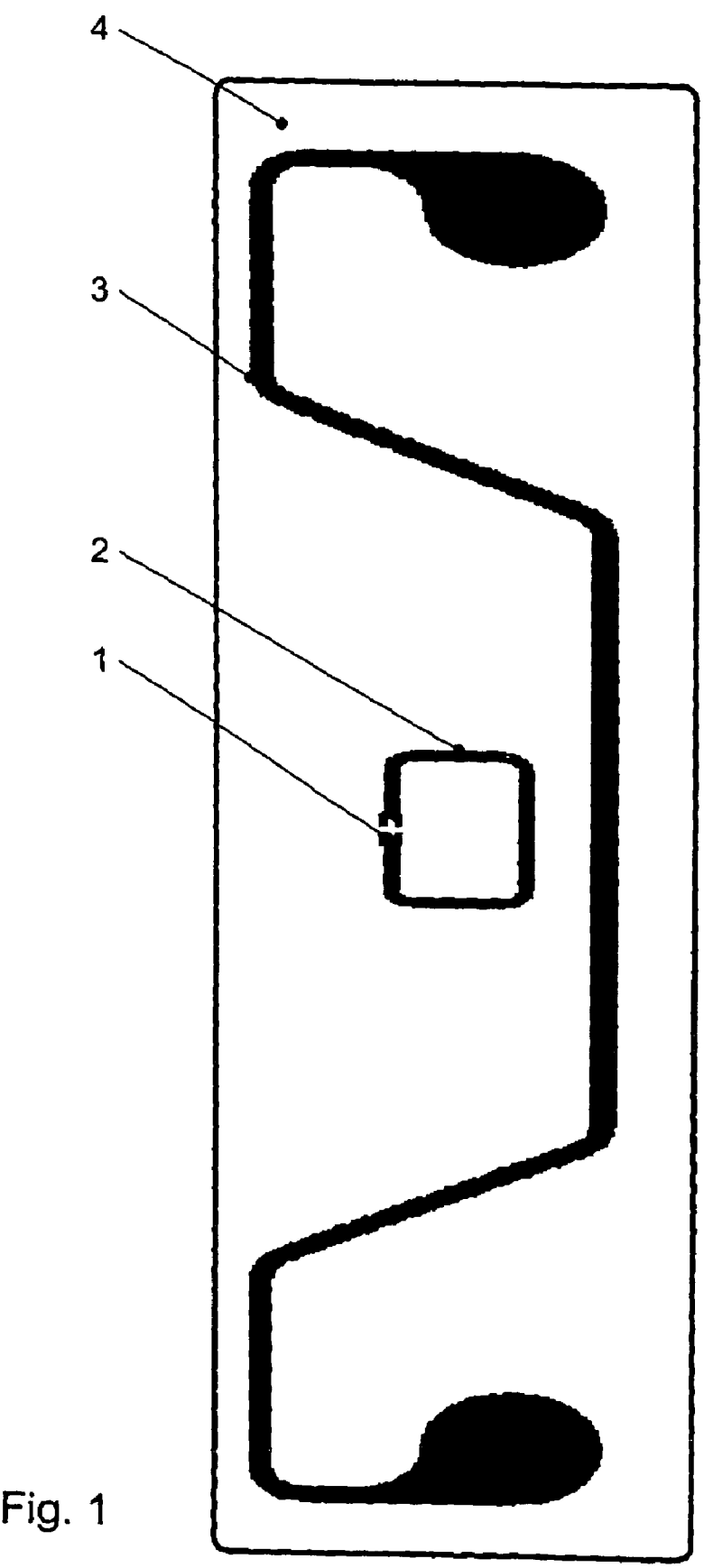

The invention, in general, relates to a radio frequency identification transponder and, more particularly, to a radio frequency identification transponder antenna.

Radio frequency identification, hereafter sometimes referred to as "RFID" makes it possible without physical or visual contact to read and store physical data and in the context of the instant invention will be understood generically to refer to a complete technical infrastructure. As a rule, a RFID system includes a transponder, also known as a tag or smart label, a transmission and receiving unit und their integration into servers, services and other systems. It is the transponder to which the instant invention relates.

2. The Prior Art

RFID transponders including a microchip, a resonant structure and an impedance matching structure are well known in the art. Usually, the transponder is connected galvanically with the resonant and impedance matching structures.

The purpose of the impedance matching structure is to tune the value of the base or termination impedance of a transponder antenna to the input impedance of the transponder chip and thus to ensure an optimization of the transmission of energy. To this end, the prior art utilizes inductively acting antenna elements of the kind described by Constantine Balanis in "Antenna Theory" (John Wiley & Sons, 1997) or by John Kraus and Ronald Marhefka in "Antennas for all Applications" (McGraw Hill 2002).

Together, the microchip and the resonant structure constitute the RFID transponder, and in the prior art the impedance matching takes place within the resonant structure. U.S. Pat. No. 6,285,342 B1 discloses a RFID transponder provided with a miniaturized resonant antenna.

The drawback of such prior art devices is that the desired optimum matching of the microchip to known structures is not only complex in terms of process and fabrication, but also, and because of it, expensive. The fabrication of the transponder necessitates high geometric precision which leads to substantial complexities in the relatively large structures.

Another disadvantage of prior art devices is the likelihood of the microchips being damaged or destroyed when exposed to electrostatic discharges. The useful life and proper functioning of the transponders are, therefore, negatively affected and at best uncertain.

OBJECTS OF THE INVENTION

It is, therefore, a general object of the invention to provide simplified matching of the termination impedance of a given antenna to the input impedance of different types of transponder chips while maintaining the far zone characteristic.

A more specific object of the invention is to improve the protection of apparatus here under consideration from electrostatic discharges.

Other objects will in part be obvious and will in part appear hereinafter.

SUMMARY OF THE INVENTION

In accordance with the invention the objects are accomplished by an arrangement of a RFID transponder provided with a microchip, an impedance-matching structure and a resonant structure, with the microchip and the structure for matching the impedance being electrically connected and the resonant structure having no galvanic connection to the microchip, and the coupling of the resonant structure with the impedance-matching structure and the microchip being an electric field.

It has surprisingly been found that a sufficiently strong field coupling exists between loop-shaped impedance-matching conductor structure and the resonant structure and that for that reason any galvanic coupling can be dispensed with.

Matching the impedance is possible by the selection of the height-width-ratio, the circumference and the shape of the contour of the impedance-matching structure as well as its distance from the resonant structure.

The arrangement in accordance with the invention for matching the microchip results in the possibility of matching the real component independently of any imaginary component. In this manner, different types of microchips as well as different mounting and assembly processes may be simply and flexibly matched to known and proven resonant structures. It will be appreciated by those skilled in the art that owing to the simple qualification this represents an economic advantage.

Further advantages are derived from the fact that because of separate supports for the resonant structure and the impedance-matching structure with the microchip, the chip assembly process and the fabrication of the resonant structures may be executed and optimized separately from each other so that the lowest possible costs may be achieved for each individual component.

It is peculiar to the arrangement in accordance with the invention that because no electrical connections are required which would involve additional costs and limitations, the structures may be connected for forming a RFID transponder by purely mechanical joining.

The preferably loop-shaped configuration of the impedance-matching structure makes possible directed near field coupling to the write-read-antenna of a programming and test device. For this purpose it is of particular advantage that the entire surface of the resonant structure may be shielded which results in suppression of the far field effect.

The near field coupling is established by a B-field. Dimensioning is done by the surface, the circumference as well as the geometric arrangement as design elements of the real component and the imaginary component.

It is a particular advantage of the invention that matching the termination impedance of the antenna to the input impedance of the assembled transponder chip can be simplified especially in transponder chips of low input impedance resulting from low resistance (real component<50Ω and/or high input capacitance including parasitic impedances resulting from the type of assembly).

A further advantage of the invention resides in the improved near field characteristic which has a pronounced direction characteristic. The RFID transponder also permits various mounting shapes and improved testing and programming, for instance by RFID transponders in a web structure during fabrication as well as for processing rolled goods in printers and dispensing apparatus.

Flexible assembly is made possible by the electrical separation of the spatially large resonant structure from the relatively small impedance-matching structure. This is one of the essential advantages of the invention since the high degree of geometric precision need be applied only to the smaller surface area, i.e. the microchip and the impedance-matching structure. This results in significant cost reductions, since the complexities relating to the geometric precision in an assembly operation increase disproportionally with respect to the surface of the structures.

The separation of the impedance-matching structure and resonant structure yields the further advantage that in case the microchip is changed only the impedance-matching structure need be matched while the resonant structure and its far field characteristic remain unchanged.

The separation of the impedance-matching structure from the resonant structure also makes possible the utilization of several resonant structures of different spatial lay-out for one transponder.

The formation on a common support, regardless of whether one or both surfaces of the support are utilized or whether the structures are each formed on a separate support is among the further advantageous features of the invention.

In principle, any flat materials not negatively affecting the functionality of the transponder may be used as substrate or support for the structures.

It is, however, particularly advantageous to form the substrate from flexible materials. Polymeric films, paper or textiles as well as rubber, leather or flexible compound materials may be used in particular. This is of particular advantage where the transponder is used as an electronic label.

The structures as such are fabricated by conventional additive or subtractive processes. Among these, in particular, are printing and etching of structures. In addition, shaping by stamping or the forming of structures by bending and/or laying of a wire loop may be advantageously employed in accordance with the invention.

In a preferred embodiment of the invention the impedance-matching structure is arranged on a first substrate and the resonant structure is arranged on a second substrate.

In another advantageous embodiment of the invention the impedance-matching structure and the resonant structure are arranged on different surfaces of a substrate.

An especially economic embodiment of the invention resides in the resonant structure being formed as the substrate and the impedance-matching structure being disposed on this substrate. The impedance-matching structure may be a stamped component applied to the substrate. In a variant of this embodiment, the impedance-matching structure may be disposed in a cavity in the substrate.

In another advantageous embodiment of the invention, the resonant structure may be an element of a package and the impedance-matching structure may be arranged on the package.

The resonant structure and the impedance-matching structure must be electrically conductive. Accordingly, they are made from metallic materials and/or electrically conductive polymers, paints and/or conductive particles. Possible uses may be, for instance, electrically conductive polymer pastes with metals and/or nano particles.

An advantageous result of the resonant structure being separated from the impedance-matching structure is the possibility of modular combinations of different type of microchips and different resonant structures for a transponder.

In addition, an advantageous effect is created in respect of the fabrication of the RFID transponder in accordance with the invention, in that the assembly of the impedance-matching structure and of the chip are fabricated with the requisite high precision, whereas the fabrication of the resonant structure is accomplished at lower tolerances and, therefore, with greater economy.

DESCRIPTION OF THE SEVERAL DRAWINGS

Figure 2:
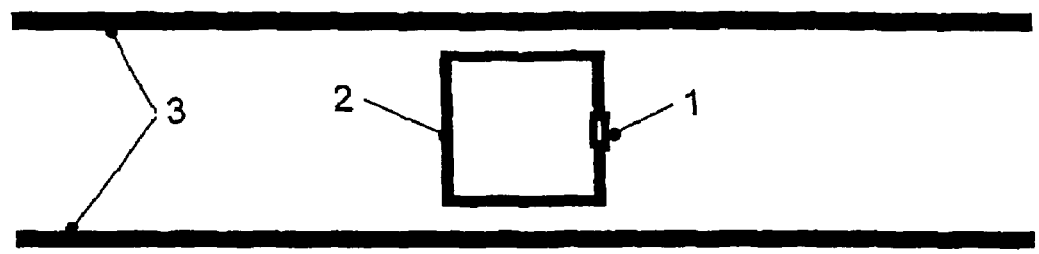
Figure 3:
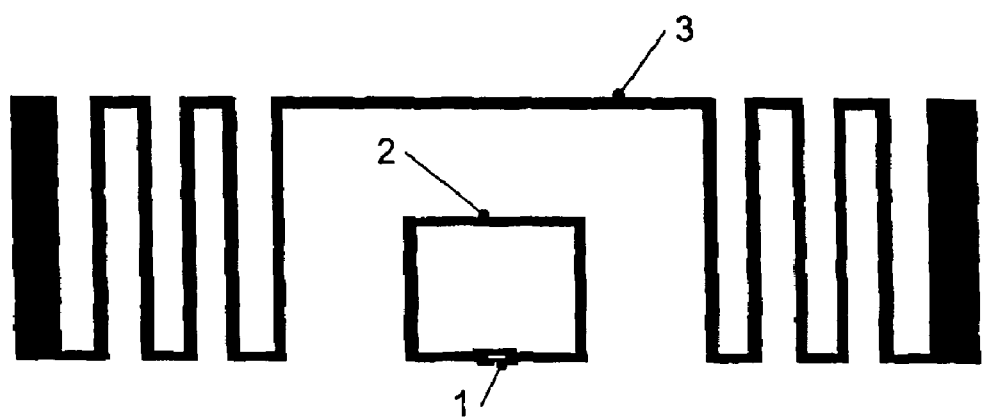
Figure 4:
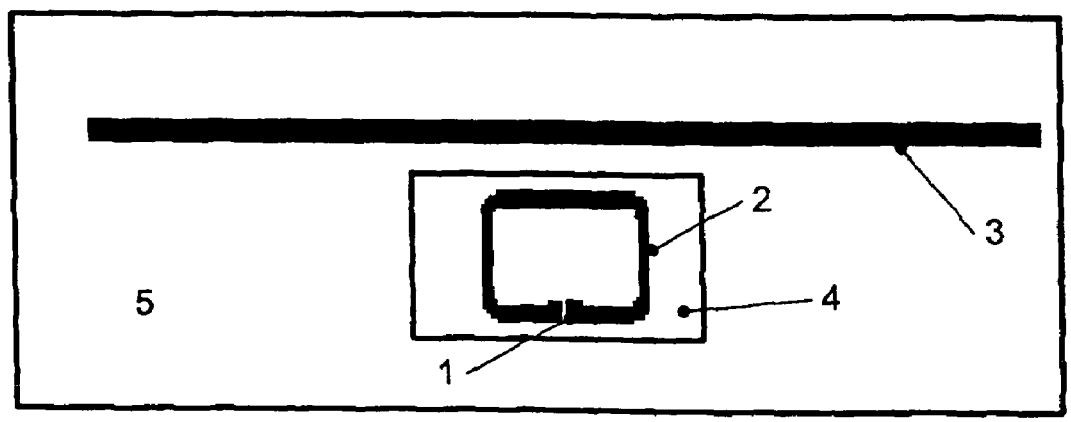
Figure 5:
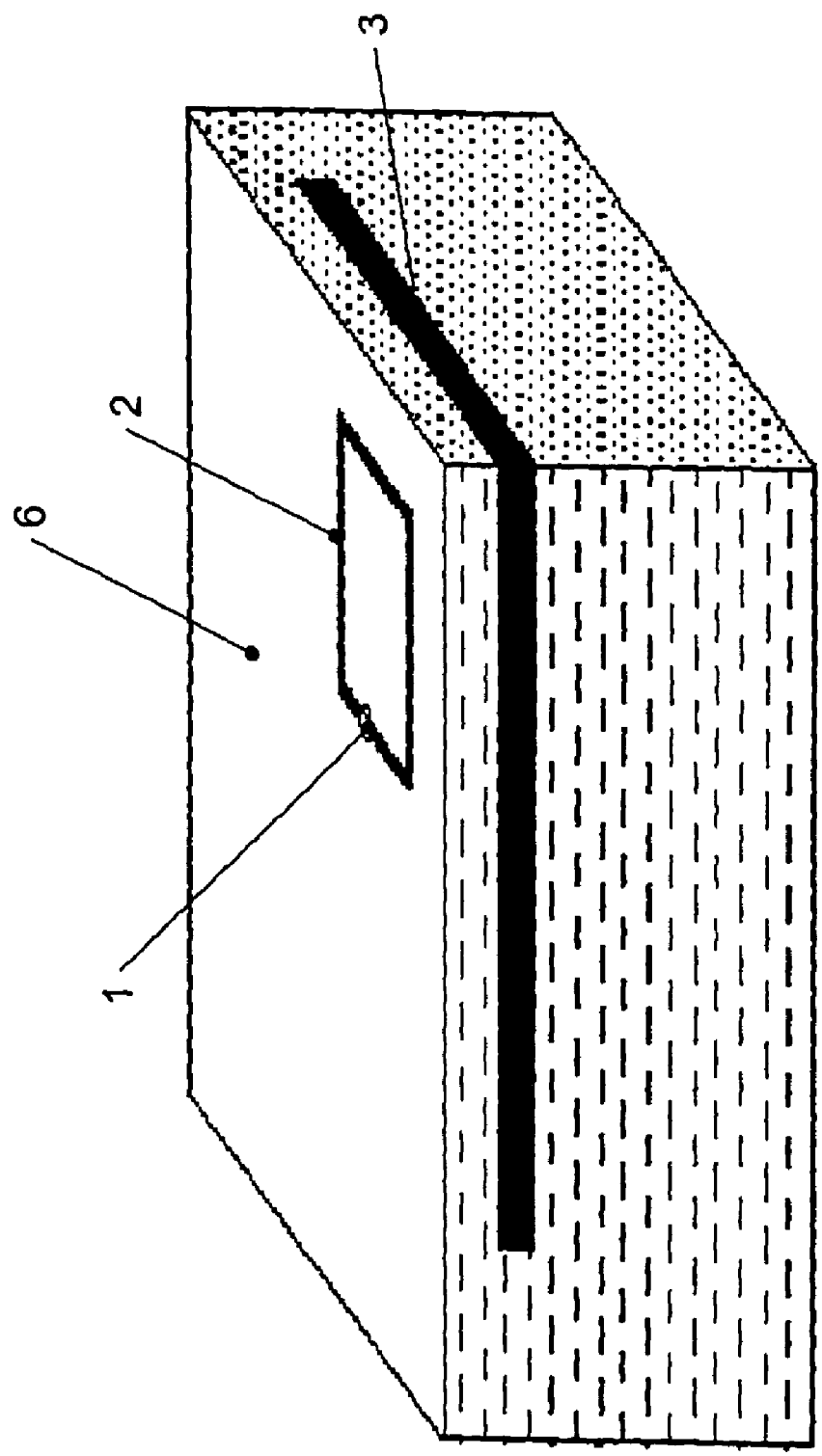

Further details, characteristics and advantages of the invention have been set forth in the ensuing description of embodiments. The novel features which are considered to be characteristic of the invention are set forth with particularity in the appended claims. The invention itself, however, in respect of its structure, construction and lay-out as well as its manufacturing techniques, together with other advantages and objects thereof, will be best understood from the following description of preferred embodiments when read in connection with the appended drawings, in which:

FIG. 1 schematically depicts a RFID transponder in accordance with the invention provided with an M-shaped resonant structure;

FIG. 2 schematically depicts a RFID transponder in accordance with the invention provided with two parallel resonant structures;

FIG. 3 schematically depicts a RFID transponder in accordance with the invention provided with a symmetric meandering resonant structure;

FIG. 4 schematically depicts a RFID transponder in accordance with the invention provided with a linear resonant structure; and FIG. 5 schematically depicts a RFID transponder in accordance with the invention exemplified as a structural element of the foot of a packaging pallet.

DETAILED DESCRIPTION OF PREFERRED EMBODIMENTS

FIG. 1 schematically depicts a RFID transponder provided with a microchip 1, an impedance-matching structure 2 and a resonant structure 3. The components are mounted on a substrate 4 which may be a flexible material such as, for example, a copper plated polyethylene terephthalate film. The impedance-matching structure has been fabricated by an etching process and is structured as a rectangular loop.

The resonant structure 3 is of an M-shaped configuration and in accordance with the invention, it is not galvanically connected to the loop structure 2 including the microchip 1.

For the sake of clarity and convenience like elements will hereafter be identified by like reference numerals.

FIG. 2 schematically shows a RFID transponder in accordance with the invention with the impedance-matching structure 2 being configured as a substantially square loop. The resonant structure 3 is formed by two parallel spaced strip structures accommodating between them loop structure 2.

FIG. 3 schematically depicts an axially symmetric arrangement of an RFID transponder in accordance with the invention. The axis of symmetry extending through the microchip 1 and a square loop impedance matching structure 2. At three of its sides the impedance matching structure 2 is circumscribed at some distance by the resonant structure 3 both ends of which are meanderingly folded at opposite sides of the Impedance-matching structure 2 in order to shorten the overall length of the transponder.

FIG. 4 is a schematic presentation of an RFID transponder with the microchip 1 and its loop impedance-matching structure 2 being mounted on a first substrate 4. The resonant structure 3 is mounted on a second substrate 5. The transponder is fabricated by arranging substrate 4 on substrate 5. The arrangement of the structure on separate or different substrates, or their fabrication at different times, by different processes, results in particularly economical manufacturing operations.

FIG. 5 schematically depicts the utilization of RFID transponder in accordance in connection with a product or its package. In the embodiment shown, the resonant structure 3 is mounted as an outwardly facing sheet metal cladding embracing two side of the foot 6 of a pallet. The impedance-matching structure 2 and the microchip 1 is mounted, and protected from ambient conditions, between the foot 6 and a board attached thereto but not shown.

By separating the resonant structure 3 from the impedance-matching structure 2 it is of particular advantage that the two components may be mounted spatially apart from each other. Where, for instance, a resonant structure 3 at the foot 6 of a pallet is damaged during transport, it can be easily repaired or replaced. The microchip 1 and its impedance-matching structure 2 being mounted in a protected position, data stored in them will not be lost and improves the safety of data transmission.

The electrical connection between the microchip 1 and the impedance-matching structure 2 is preferably formed by contact bumps by way of flip chip assembly. As will be appreciated by those skilled in the art, connections by wires, printed circuits or contacts fabricated by additive processes are also possible.

What is claimed is:

1. A RFID transponder, comprising:
    a microchip comprising a real component;
    an impedance-matching structure of looped configuration electrically connected to the microchip;
    a resonant structure connected to the microchip and impedance-matching structure by an electric field and positioned relative to the impedance-matching structure so as to match the termination impedance of the antenna to the real component of the microchip.

2. The transponder of claim 1, further comprising a first substrate for mounting at least the impedance-matching component.

3. The transponder of claim 2, wherein the microchip is mounted on the first substrate.

4. The transponder of claim 3, wherein the resonant component is mounted on the first substrate.

5. The transponder of claim 2, wherein the first substrate comprises first and second surfaces and wherein the impedance-matching structure is mounted on the first surface and the resonant structure is mounted on the second surface.

6. The transponder of claim 5, wherein the first and second surfaces are disposed on opposite sides of the substrate.

7. The transponder of claim 2, further comprising a second substrate for mounting the resonant structure.

8. The transponder of claim 2, wherein the substrate is flexible.

9. The transponder of claim 8, wherein the entire transducer is flexible.

10. The transponder of claim 8, wherein the substrate consists of one of polymer film, paper, textile, rubber, leather and flexible polymer laminate.

11. The transponder of claim 1, further comprising a substrate forming the resonant structure and wherein the impedance-matching structure is mounted on the substrate.

12. The transponder of claim 11, wherein the impedance-matching structure is deposited on the substrate as one of a metallic stamped component, a stamped and bent component, and a wire.

13. The transponder of claim 11, wherein the substrate is provided with a cavity and wherein the impedance-matching structure is provided in the cavity.

14. The transponder of claim 1, wherein the resonant structure is structured as an element of an article to be marked and wherein the impedance-matching structure is arranged on the article.

15. The transponder of claim 1, wherein at least one of the resonant structure and the impedance-matching structure are made of one of metal, electrically conductive polymer, electrically conductive dyes and electrically conductive particles.

16. The transponder of claim 1, wherein the resonant structure is of a substantially M-shaped configuration.

17. The transponder of claim 1, wherein the microchip is connected to the impedance-matching structure by one of flip chip mounting, wire, printed contacts and contacts fabricated by an additive process.

* * * * *